April 28, 1942.  R. B. BARNES  2,280,993
TURBIDIMETER
Filed Dec. 5, 1940  2 Sheets-Sheet 1
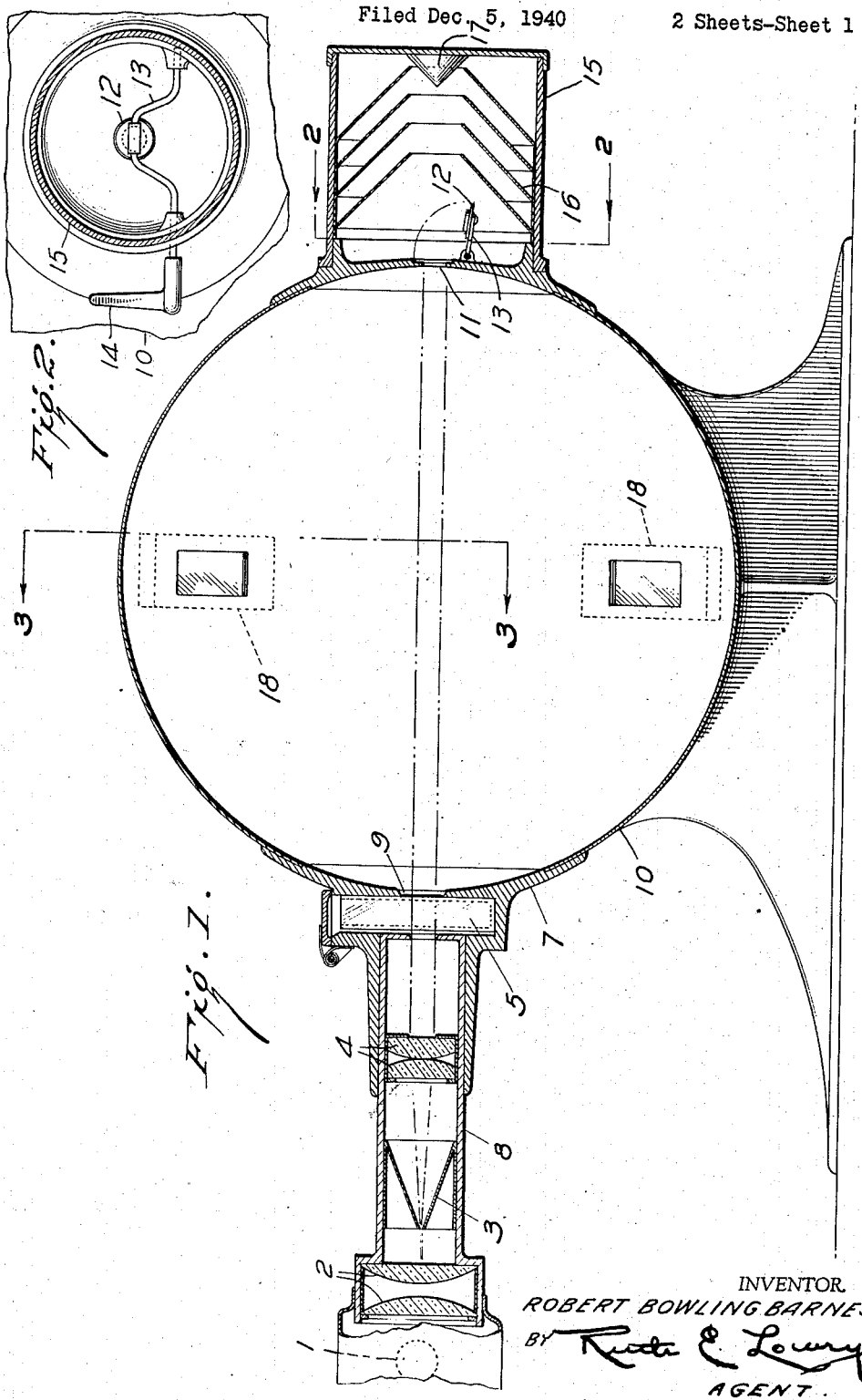
INVENTOR.
ROBERT BOWLING BARNES,
BY
AGENT.

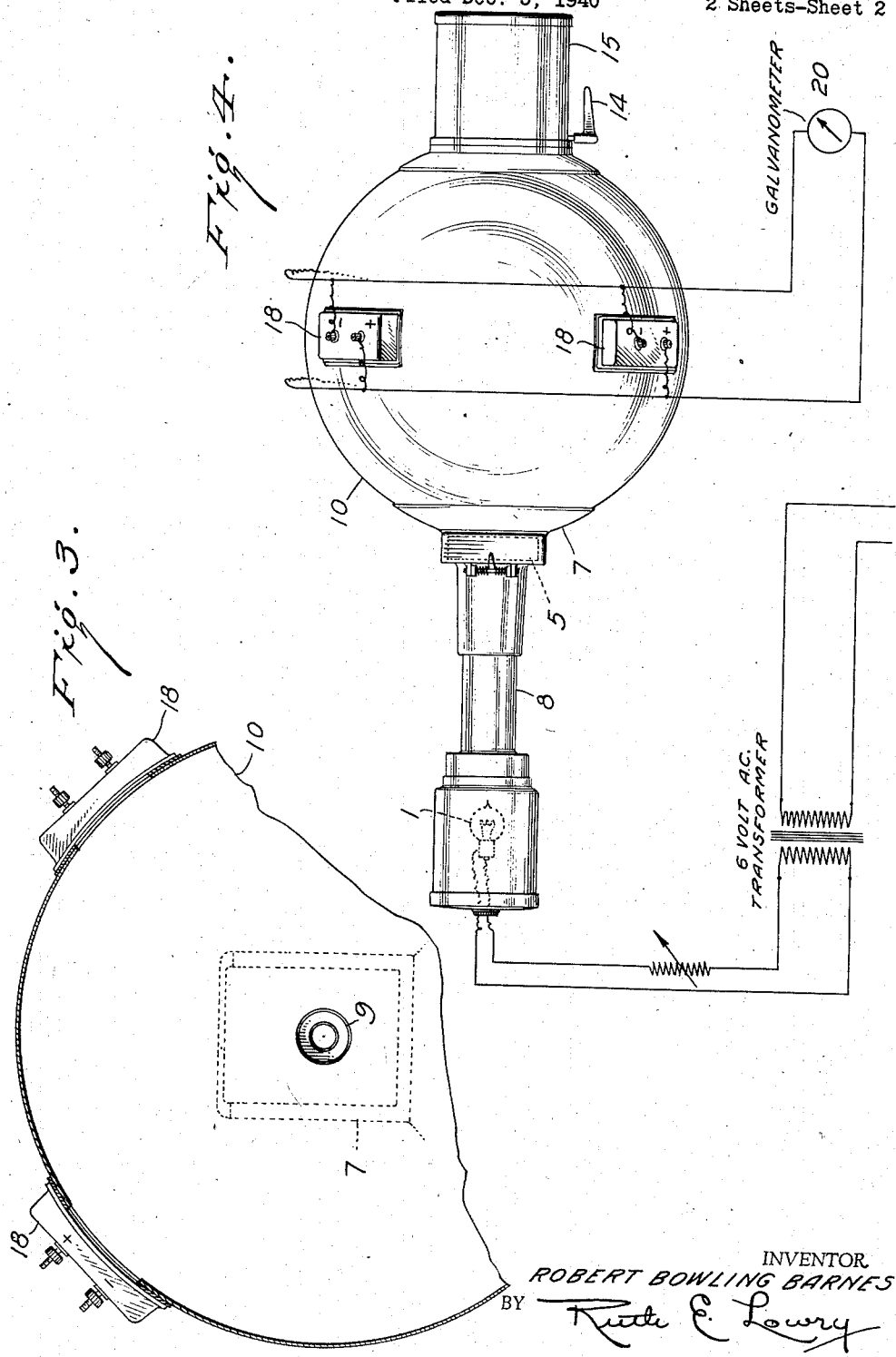

Patented Apr. 28, 1942

2,280,993

UNITED STATES PATENT OFFICE 2,280,993

TURBIDIMETER

Robert Bowling Barnes, Stamford, Conn., assignor to American Cyanamid Company, New York, N. Y., a corporation of Maine Application December 5, 1940, Serial No. 368,574

5 Claims. (Cl. 88—14)

This invention relates to a turbidimeter and more particularly it is directed to a device which is capable of direct measurement of turbidity or haze.

The measurement of light scattering caused by fine granules dispersed in solution or soot particles contained in stack gases has not heretofore been practically accomplished. In the main, comparison devices have been employed, but these devices not only require rather complicated optics and depend on a perfectly uniform source of light so that constant adjustments are necessary, but they cannot be used for measuring the turbidity of anything but perfectly colorless or constant-color samples. Either correction factors must be introduced differing for every color possible, or a vast number of standards must be available for matching with samples. Neither alternative is worth consideration from a practical standpoint and hence up to the present invention there has been no suitable device for evaluating turbidity from a measurement of light scattering regardless of the color of the sample.

The present invention contemplates a device which irrespective of color or achromatic absorption gives a direct reading of turbidity or haze of the material under consideration. This is accomplished by measuring the amount of light in an integrating sphere receiving both scattered and directly transmitted light from a sample, and then measuring the integrated light remaining in the sphere when a shutter exposing a light absorbing chamber on the integrating sphere directly opposite the light receiving window, is opened. The difference is of course the amount of light from the sample which is transmitted directly. In neither instance is the intensity of the light at its source important, hence it is immaterial how much of the light is actually absorbed in passing through the colored sample. Furthermore since comparison of light scattered and total light transmitted is made rapidly using a single cell in only one position and a single light path, simply by closing and opening the shutter of the light absorbing chamber, variations in the intensity and character of the light emitted from the source can be disregarded. In other words, the actual sample is its own standard and it is possible using the present device to determine the turbidity of say a red sample and immediately thereafter without any adjustments determine the turbidity of a blue sample and the two values so obtained will be a comparison of true turbidity irrespective of color differences.

The operation and advantages of the device will become more apparent when considered in conjunction with the drawings in which:

Fig. 1 is a longitudinal section of a turbidimeter of the present invention;

Fig. 2 is a sectional view of the exit window on the integrating sphere leading to the light absorption chamber and closing means therefor taken along the line 2—2;

Fig. 3 is a sectional view partly broken away taken along the line 3—3 showing in greater detail the location of photocells on the integrating sphere; and Fig. 4 is a top plan view of the turbidimeter and accompanying electrical circuits.

The turbidimeter framework may be considered as in four sections, namely, optic barrel 8, cell holder 7, integrating sphere 10, and light absorbing chamber 15.

In the optic barrel 8 is housed a suitable source of light 1 shown in Fig. 4 as in incandescent lamp operating on low voltage, and condensing lenses 2 through which the light is passed converging the rays and passing them through a small orifice in the frusto-conical shell 3 to form a fine pencil beam. Condensing lenses 4 placed in the path of this beam narrow it further and the parallel beam then passes through the sample contained in the sample cell 5. In the drawings a separate cell is shown with quartz or glass walls depending on the optics used, that is inserted in an enclosed cell holder, but it should also be understood that the cell holder may be adapted for continuous passage of material.

The narrow parallel beam of light after passing through the sample enters the integrating sphere 10 through window 9. The interior walls of the integrating sphere 10 and the side of shutter 12 exposed to the light beams in the sphere, are coated with a diffusely reflecting substance such as magnesium carbonate. Shutter 12 closes exit window 11 which is placed directly opposite entrance window 9 on the integrating sphere and leads into light absorbing chamber 15. The dimensions of entrance and exit windows 9 and 11 respectively, are exactly the same so that all portions of the narrow parallel beam which are not scattered on entering the integrating sphere will be transmitted directly through it and enter light absorbing chamber 15 when the shutter is open. The structural details of the shutter are not critical except insofar as the surface exposed to the light beam when the light absorbing chamber is closed off must be of some diffusely reflecting material. We have found, however, that a simple and rapidly operated closure consisting of a disc 12 mounted on axle 13 having an offset position, which can be turned manually by lever 14, is very effective since the position of lever 14 indicates the position of the disc within the housing. The details of this particular shutter construction are shown more fully in Fig. 2.

The light absorbing chamber 15 directly attached to the integrating sphere 10 through window 11, consists of a rectangular box with darkened light absorbing walls and baffles 16 which extend out from the side walls parallel to each other and at right angles to the sides of reflecting cone 17, but leaving a narrow aisle down the center of the chamber. Any light transmitted directly through the sample and integrating sphere will enter this light absorbing chamber when shutter 12 is open and either be absorbed directly on entering or strike the conical light reflector 17 thereby being specularly reflected off at an angle to be trapped by the baffles and chamber walls, so that substantially none finds its way out into the integrating sphere again.

Photocells 18 are suitably positioned on the integrating sphere and connected in parallel to galvanometer 20. In Fig. 3 a section through the integrating sphere shows two of the four photocells spaced 90° apart on the circumference. It is apparent that any number of photocells spaced equidistant on the sphere may be employed, but for most purposes an accurate and representative reading is obtained using at least four in conjunction with the low powered lamp shown in the drawings. The photocells need not be perfectly matched, nor is the problem of fatigue serious since the value for turbidity is calculated from a ratio of two readings on the galvanometer and hence such factors can be disregarded.

In order to determine the degree of turbidity of a sample to be measured, the shutter 12 is at first closed and all the light, both diffused and transmitted directly through the sample, is collected in the integrating sphere impinging on the photoelectric means which effects a movement of the pointer on the galvanometer scale. The exit window of the integrating sphere 10 is then opened and without moving the sample out of position, a second reading is taken of the galvanometer pointer. Any light from the sample which is transmitted undeviated, traverses the integrating sphere, enters the darkened chamber 15, and is effectively absorbed so that only the diffused or scattered light is present in the integrating sphere when the shutter 12 is open. Hence, except in the case of a hypothetical sample which scatters all of the light diffusely and none is transmitted directly, this second reading on the galvanometer scale will be lower than that obtained when the shutter is closed and the total light is measured. It will readily be apparent that the difference in reading will measure the amount of light which the sample transmits directly, and it is possible with the values obtained to calculate the percentage of light which is diffused in passing though the sample and thus arrive at a value for the turbidity of the solution. Thus, $$\% \text{ turbidity} = \frac{100\, S_o}{S_c}$$

in which $S_o$ represents the reading on the galvanometer scale when the shutter is open and $S_c$ represents the reading on the galvanometer scale when the shutter is closed.

Fig. 4 shows in greater detail the preferred embodiment of the present invention, that is, using a variable resistance in the circuit of the light source so that its intensity can be varied effecting a variation in the amount of integrated light and hence a movement of the pointer on the galvanometer scale. When this adjustment of the pointer on the galvanometer scale is not possible, the percentage turbidity can be calculated by the formula given above. However, by employing an adjustable resistance in the lamp circuit, or other adjusting means, direct readings can be made by changing the intensity of the light until the pointer on the galvanometer scale reads 100 or full deflection when the shutter is closed, that is, when 100% of the light leaving the sample cell is contained in the integrating sphere. The shutter is then opened allowing the non-diffused light to pass through the integrating sphere and be trapped by the light absorbing chamber, and the galvanometer will then indicate a number less than 100 which is the percent turbidity or relative amount of light scattering caused by fine particle dispersion in solution, haze or cloudiness of translucent objects, the denseness of smoke from stack gases, etc., depending on the particular problem concerned. By this method not only is it possible to determine quickly and accurately the percentage turbidity, but greater sensitivity of the galvanometer is made possible as the full scale from 0 to 100 is available for samples of any color.

In order to take full advantage of the adjustable resistance in the lamp circuit which constitutes a preferred embodiment of the present invention, the light source and photoelectric cells on the integrating sphere should be chosen so that with the darkest sample to be measured, enough light will be transmitted so that with the shutter closed a reading of approximately 100 will be recorded on the galvanometer. When samples of a lighter color are used, a resistance is introduced so that the intensity of the light source is cut down. Naturally the use for which the turbidimeter is adapted dictates what amount of resistance is necessary for in some cases the range of transmission may be very limited while in others the device may be used to measure turbidity or haze of samples with large variation in transmission. The adjustment of the galvanometer can also be effected by employing a variable resistance in the galvanometer circuit itself and it is not intended that the invention be limited to the use of a resistance in the lamp circuit, but broadly includes any refinements that the operator finds desirable to employ.

It may be desirable in some cases to determine the percent of the parallel light beam transmitted in a straight line instead of that diffusely scattered. This can readily be achieved by changing the scale reading instead of 0 to 100 from left to right, to read 0 at the right, or full deflection, and 100 on the left. In order to read percent of directly transmitted light the shutter is first closed and the galvanometer adjusted as before so the pointer rests on 0 at the extreme right. The shutter is then opened and the pointer falls back pointing to a number which gives directly the percent of unscattered light as compared with the total light transmitted. In the same device therefore, the percent turbidity of a sample or the percent of non-diffused light transmitted can be measured rapidly if a double scale on the galvanometer is used.

It is a further advantage of the present invention that the intensity of the light source and the type of light emitted are not critical as the device operates effectively whether the source of light is essentially visible light or whether it is high in bands in the extreme portions of the spectrum such as the infrared or ultraviolet. However, if it is desired to measure the transmission of the far infrared radiation, thermocouples or bolometers are advantageously employed in place of photocells, and with the use of a source of ultraviolet radiation or the far infrared, quartz lenses or rock crystal optics can be substituted for the glass optics suitable for ordinary light. Aside from these and other minor alterations which would be readily apparent to the man skilled in the art, the device can be used interchangeably with light sources of variable wavelength. Furthermore, the light source does not have to be standardized but will give identical check readings even though the candle power may have varied, since by using an adjustable resistance in the light circuit to set the galvanometer pointer at a predetermined point on the scale, this variable factor is cancelled out. Even when this adjustment is not possible an accurate calculation can be made because the percent turbidity is determined from two readings taken rapidly, and although the readings in one set may vary considerably from those of another because of variation in the intensity of light, the ratio will be the same, and hence check results will be obtained.

It will be apparent that slight structural changes may be desirable in some cases and can be made without departing from the spirit and scope of the present invention.

What I claim is:

1. A device for measuring turbidity or haze which comprises in combination a hollow body having a diffusely reflecting internal surface and oppositely disposed apertures small in area compared to the total inner surface of the hollow body, a source of light, means for directing a beam of light from said source through one of said apertures at right angles thereto, means for preventing the entering of any stray light through said aperture, means for retaining a transparent cell containing material the turbidity of which is to be measured interposed in said beam closely adjacent to said aperture, a light absorber disposed externally to said hollow body adjacent to the second aperture, means for closing the second aperture, said means when shutting off the aperture forming with the interior of the hollow body a continuous diffusely reflecting surface and photoelectric indicating means for measuring the integrated light in said hollow body.

2. A device for measuring turbidity or haze which comprises in combination a hollow body having a diffusely reflecting internal surface and oppositely disposed apertures small in area compared to the total inner surface of the hollow body, a source of light, means for directing a beam of light from said source through one of said apertures at right angles thereto, means for preventing the entering of any stray light through said aperture, means for retaining a transparent cell containing material the turbidity of which is to be measured interposed in said beam closely adjacent to said aperture, a light absorbing chamber equipped with absorbing baffles disposed externally to said hollow body adjacent to the second aperture, a shutter for closing off said second aperture, the entire surface of the shutter when closed forming with the interior of the hollow body a continuous diffusely reflecting surface and at least one photoelectric cell positioned on the periphery of the hollow body and a galvanometer connected to said photoelectric cell to indicate the current thereof.

3. A device according to claim 2 in which means are provided for adjusting the galvanometer reading to a predetermined value.

4. A device according to claim 2 in which the light source is an incandescent electric lamp and a variable resistance is provided in the filament circuit of the lamp for varying the intensity of the light emitted therefrom.

5. A device according to claim 2 in which the baffles of the light absorbing chamber are in the form of light absorbing frusto conical baffles extending inwardly from the walls of said chamber, the baffles being the inclined sides of concentric hollow frusta with the axis of the cones parallel to the beam of light and the conical baffles being concave toward the aperture of the hollow body and a reflecting cone on the chamber wall opposite the said aperture having its axis parallel to the light beam whereby light of the beam entering the light absorber is totally reflected by said cone into the spaces between the baffles and is absorbed thereby.

ROBERT BOWLING BARNES.